United States Patent
Xin et al.

(10) Patent No.: US 10,540,070 B2
(45) Date of Patent: *Jan. 21, 2020

(54) METHOD FOR TRACKING DISPLAYS DURING A COLLABORATION SESSION AND INTERACTIVE BOARD EMPLOYING SAME

(71) Applicant: SMART Technologies ULC, Calgary (CA)

(72) Inventors: Min Xin, Calgary (CA); Michael Boyle, Calgary (CA); Kathryn Rounding, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 649 days.

This patent is subject to a terminal disclaimer.

(21) Appl. No.: 15/070,929

(22) Filed: Mar. 15, 2016

(65) Prior Publication Data

US 2016/0320952 A1 Nov. 3, 2016

Related U.S. Application Data

(63) Continuation of application No. 14/672,476, filed on Mar. 30, 2015, now Pat. No. 9,288,440.

(Continued)

(51) Int. Cl.
*G06F 3/0484* (2013.01)
*H04N 7/15* (2006.01)
(Continued)

(52) U.S. Cl.
CPC .......... *G06F 3/04845* (2013.01); *G06F 3/017* (2013.01); *G06F 3/0304* (2013.01); *G06F 3/0321* (2013.01); *G06F 3/03542* (2013.01); *G06F 3/0412* (2013.01); *G06F 3/0421* (2013.01); *G06F 3/0428* (2013.01); *G06F 3/0484* (2013.01); *G06F 3/1423* (2013.01); *G06Q 10/10* (2013.01); *G09B 5/08* (2013.01); *H04L 12/1822* (2013.01); *H04N 7/147* (2013.01); *H04N 7/152* (2013.01); *G06F 2203/04101* (2013.01);
(Continued)

(58) Field of Classification Search
CPC combination set(s) only.
See application file for complete search history.

(56) References Cited

U.S. PATENT DOCUMENTS

2010/0241691 A1* 9/2010 Savitzky ................. G06F 15/16
709/203
2013/0325970 A1* 12/2013 Roberts .............. H04N 21/4788
709/206

(Continued)

*Primary Examiner* — Phung-Hoang J Nguyen
(74) *Attorney, Agent, or Firm* — King & Schickli, PLLC (57) ABSTRACT

A method is described for manipulating a view displayed on one or more follower participants' devices to track a view displayed on a lead participant's device. A request to manipulate the view displayed on the one or more follower participant devices is received. The lead participant is identified. The follower participants are identified. A lead view of the lead participant is determined. The lead view is communicated to the follower participants computing devices for display. A computing device and a non-transitory computer readable medium having instructions configured to implement the method are also described.

17 Claims, 8 Drawing Sheets

Related U.S. Application Data

(60) Provisional application No. 61/972,690, filed on Mar. 31, 2014.

(51) Int. Cl.

| | | |
|---|---|---|
| *G06F 3/041* | (2006.01) | |
| *G06F 3/042* | (2006.01) | |
| *G06F 3/03* | (2006.01) | |
| *G06F 3/01* | (2006.01) | |
| *G06F 3/0354* | (2013.01) | |
| *H04N 7/14* | (2006.01) | |
| *G06F 3/14* | (2006.01) | |
| *G06Q 10/10* | (2012.01) | |
| *G09B 5/08* | (2006.01) | |
| *H04L 12/18* | (2006.01) | |
| *G09B 5/10* | (2006.01) | |

(52) U.S. Cl.
CPC .............. *G06F 2203/04104* (2013.01); *G06F 2203/04109* (2013.01); *G06F 2203/04808* (2013.01)

(56) References Cited

U.S. PATENT DOCUMENTS

2016/0259506 A1\* 9/2016 Wenger ................. G06F 3/0482
2016/0328801 A1\* 11/2016 Laurentino ............ H04N 7/155

\* cited by examiner

METHOD FOR TRACKING DISPLAYS DURING A COLLABORATION SESSION AND INTERACTIVE BOARD EMPLOYING SAME

The present application is a continuation of U.S. patent application Ser. No. 14/672,476, filed on Mar. 30, 2015 and entitled "METHOD FOR TRACKING DISPLAYS DURING A COLLABORATION SESSION AND INTERACTIVE BOARD EMPLOYING SAME" which claims benefit of priority to U.S. Provisional Application No. 61/972,690 filed on Mar. 31, 2014 and entitled "METHOD FOR TRACKING DISPLAYS DURING A COLLABORATION SESSION AND INTERACTIVE BOARD EMPLOYING SAME", both applications are incorporated herein by reference in their entireties.

BACKGROUND

Interactive input systems that allow users to inject input (e.g., digital ink, mouse events etc.) into an application program using an active pointer (e.g., a pointer that emits light, sound, or other signal), a passive pointer (e.g., a finger, cylinder or other suitable object) or other suitable input devices such as for example, a mouse, or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001, all assigned to SMART Technologies of ULC of Calgary, Alberta, Canada, assignee of the subject application, the entire disclosures of which are incorporated by reference; touch systems comprising touch panels employing electromagnetic, capacitive, acoustic or other technologies to register pointer input: tablet and laptop personal computers (PCs); smartphones; personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital imaging devices at its corners. The digital imaging devices have overlapping fields of view that encompass and look generally across the touch surface. The digital imaging devices acquire images looking across the touch surface from different vantages and generate image data. Image data acquired by the digital imaging devices is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, the total internal reflection (TIR) of light traveling through an optical waveguide is frustrated when an object such as a pointer touches the waveguide surface, due to a change in the index of refraction of the waveguide, causing some light to escape from the touch point. In such a multi-touch interactive input system, the machine vision system captures images including the point(s) of escaped light, and processes the images to identify the touch position on the waveguide surface based on the point(s) of escaped light for use as input to application programs.

In order to facilitate collaboration, a plurality of computing devices can connect to a common host server. The host server executes a collaboration application that allows users of the plurality of computing devices to work together in a common collaborative session. However, since the users of the plurality of computing devices can navigate the application independent of the other users, collaboration between the users may become cumbersome.

It is therefore an object to provide a novel method of navigation during a collaboration session and a novel interactive board employing the same.

SUMMARY OF THE INVENTION

According to an aspect there is provided a method for manipulating a view displayed on one or more follower participants' devices to track a view displayed on a lead participant's device, the method comprising: receiving a request to manipulate the view displayed on the one or more follower participant devices; identifying the lead participant; identifying the follower participants; determining a lead view of the lead participant: and communicating the lead view to the follower participants computing devices for display.

According to another aspect there is provided a non-transitory computer readable medium having stored thereon instructions which, when executed by a computing device, cause the computing device to: receive a request to manipulate the view displayed on the one or more follower participant devices; identify the lead participant; identify the follower participants: determine a lead view of the lead participant: and communicate the lead view to the follower participants computing devices for display.

According to yet another aspect there is provided a computing device comprising: a communication interface for communicating with other computing devices: memory for storing instruction; and a processor configured to execute the instructions, which cause the computing device to: receive a request to manipulate the view displayed on the one or more follower participant devices; identify the lead participant; identify the follower participants; determine a lead view of the lead participant; and communicate the lead view to the follower participants computing devices for display.

BRIEF DESCRIPTION OF THE DRAWINGS

Embodiments of the invention will now be described by way of example only with reference to the accompanying drawings in which.

DETAILED DESCRIPTION OF THE EMBODIMENTS

Figure 1:
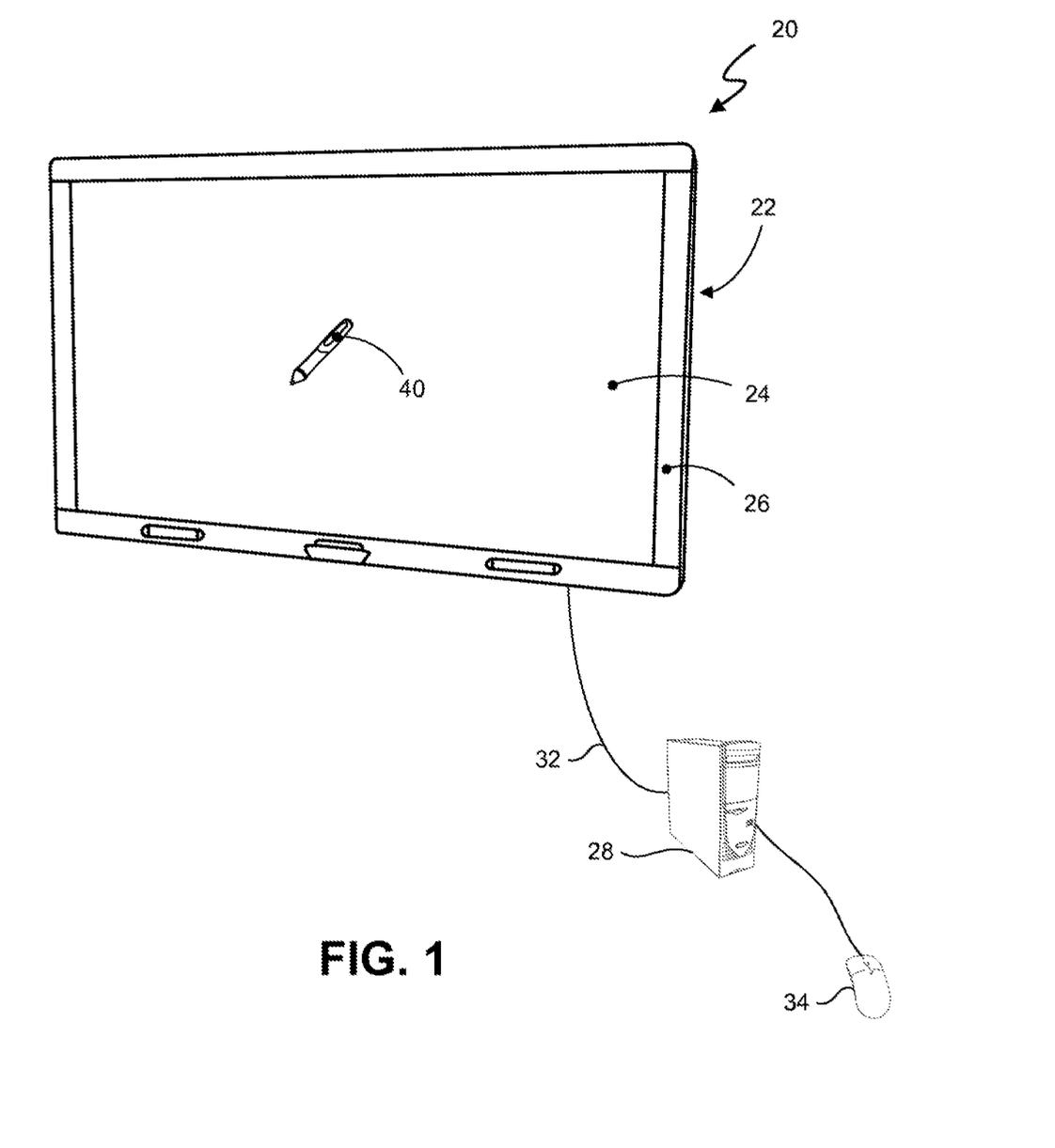
FIG. 1 is a diagram of an interactive input system.

For convenience, like numerals in the description refer to like structures in the drawings. Referring to FIG. 1, an interactive input system that allows a user to inject input such as digital ink, mouse events etc. into an executing application program is shown and is generally identified by reference numeral 20. In this embodiment, interactive input system 20 comprises an interactive board 22 mounted on a vertical support surface such as for example, a wall surface or the like or otherwise suspended or supported in an upright orientation. Interactive board 22 comprises a generally planar, rectangular interactive surface 24 that is surrounded about its periphery by a bezel 26. An image, such as for example a computer desktop is displayed on the interactive surface 24. In this embodiment, a liquid crystal display (LCD) panel or other suitable display device displays the image, the display surface of which defines interactive surface 24.

The interactive board 22 employs machine vision to detect one or more pointers brought into a region of interest in proximity with the interactive surface 24. The interactive board 22 communicates with a general purpose computing device 28 executing one or more application programs via a universal serial bus (USB) cable 32 or other suitable wired or wireless communication link. General purpose computing device 28 processes the output of the interactive board 22 and adjusts image data that is output to the interactive board 22, if required, so that the image presented on the interactive surface 24 reflects pointer activity. In this manner, the interactive board 22 and general purpose computing device 28 allow pointer activity proximate to the interactive surface 24 to be recorded as writing or drawing or used to control execution of one or more application programs executed by the general purpose computing device 28.

Imaging assemblies (not shown) are accommodated by the bezel 26, with each imaging assembly being positioned adjacent a different corner of the bezel. Each imaging assembly comprises an image sensor and associated lens assembly that provides the image sensor with a field of view sufficiently large as to encompass the entire interactive surface 24. A digital signal processor (DSP) or other suitable processing device sends clock signals to the image sensor causing the image sensor to capture image frames at the desired frame rate. The imaging assemblies are oriented so that their fields of view overlap and look generally across the entire interactive surface 24. In this manner, any pointer such as for example a user's finger, a cylinder or other suitable object, a pen tool 40 or an eraser tool that is brought into proximity of the interactive surface 24 appears in the fields of view of the imaging assemblies and thus, is captured in image frames acquired by multiple imaging assemblies.

When the imaging assemblies acquire image frames in which a pointer exists, the imaging assemblies convey the image frames to a master controller. The master controller in turn processes the image frames to determine the position of the pointer in (x,y) coordinates relative to the interactive surface 24 using triangulation. The pointer coordinates are then conveyed to the general purpose computing device 28 which uses the pointer coordinates to update the image displayed on the interactive surface 24 if appropriate. Pointer contacts on the interactive surface 24 can therefore be recorded as writing or drawing or used to control execution of application programs running on the general purpose computing device 28.

The general purpose computing device 28 in this embodiment is a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computing device components to the processing unit. The general purpose computing device 28 may also comprise networking capability using Ethernet, WiFI, and/or other network format, for connection to access shared or remote drives, one or more networked computers, or other networked devices. The general purpose computing device 28 is also connected to the World Wide Web via the Internet.

The interactive input system 20 is able to detect passive pointers such as for example, a user's finger, a cylinder or other suitable objects as well as passive and active pen tools 40 that are brought into proximity with the interactive surface 24 and within the fields of view of imaging assemblies. The user may also enter input or give commands through a mouse 34 or a keyboard (not shown) connected to the general purpose computing device 28. Other input techniques such as voice or gesture-based commands may also be used for user interaction with the interactive input system 20.

The general purpose computing device 28 is configured to run a web browser application that allows the general purpose computing device 28 to be connected to a remote host server (not shown) hosting a collaboration application. Similar to the general purpose computing device 28, the remote host server is a personal computer, network computer or other suitable processing device.

The collaboration application allows a collaboration session for one or more computing devices connected to the remote host server via a network connection to be established. Different types of computing devices may connect to the remote host server to join the collaboration session. Examples of such computing devices include the general purpose computing device 28, laptop or notebook computers, tablets, desktop computers, smartphones, professional digital assistants (PDAs) and the like. Examples of the network connection include local area networks, such an intranets, and wide area networks, such as the Internet.

One or more participants can join the collaboration session by connecting their respective computing devices to the remote host server via web browser applications running thereon. Participants of the collaboration session can all be co-located at a common site, or can alternatively be located at different sites. It will be understood that the computing devices may run any operating system such as Microsoft Windows™, Apple iOS, Apple OS X, Linux, Android and the like. The web browser applications running on the computing devices provide an interface to the remote host server, regardless of the operating system.

When a computing device user wishes to join the collaborative session, the web browser application in launched on the computing device. An address of the collaboration application running on the remote host server, usually in the form of a uniform resource locator (URL), is entered into the web browser. This action results in a collaborative session join request being sent to the remote host computer. In response, the remote host server returns code, such as HTML5 code for example, to the computing device. The web browser application launched on the computing device in turn parses and executes the received code to display a shared two-dimensional workspace of the collaboration application within a window provided by the web browser application. The web browser application also displays functional menu items, buttons and the like within the window for selection by the user. Each collaboration session has a unique identifier associated with it, allowing multiple users to remotely connect to the collaboration session. The unique identifier forms part of the URL address of the collaboration session. For example, the URL "canvas.smartlabs.mobi/default.cshtml?c=270" identifies a collaboration session that has an identifier 270.

The collaboration application communicates with each computing device joined to the collaboration session, and shares content of the collaboration session therewith. During the collaboration session, the collaboration application provides the two-dimensional workspace, referred to herein as a canvas, onto which input may be made by participants of the collaboration session. The canvas is shared by all computing devices joined to the collaboration session.

Figure 2:
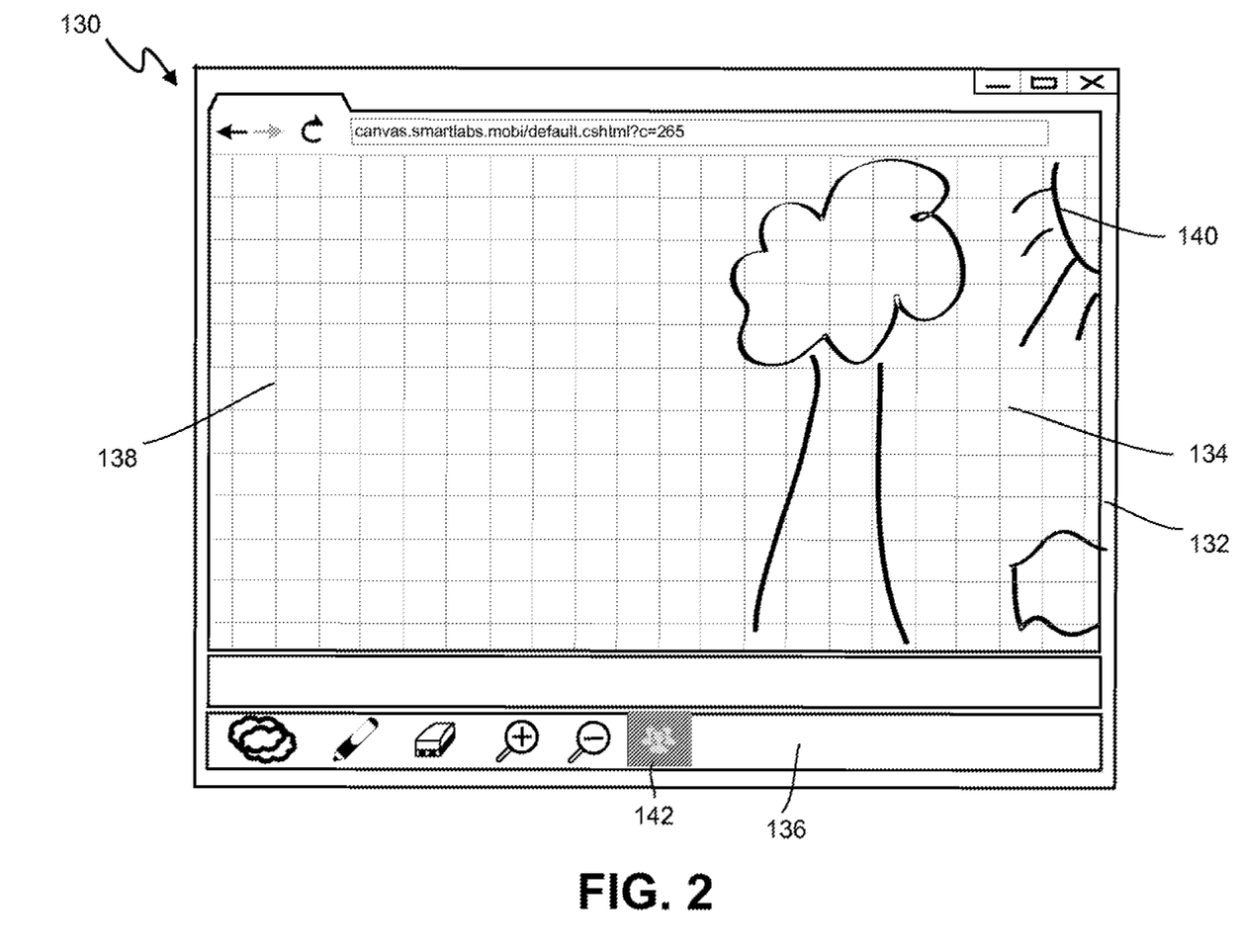
FIG. 2 is a schematic view of an exemplary web browser application window.

Referring to FIG. 2, an exemplary web browser application window is illustrated generally by numeral 130. The web browser application window 130 is displayed on the interactive surface 24 when the general purpose computing device 28 connects to the collaboration session. Internet browser application window 130 comprises an input area 132 in which the canvas 134 is displayed. The canvas 134 is configured to be extended in size within its two-dimensional plane to accommodate new input as needed during the collaboration session. As will be understood, the ability of the canvas 134 to be extended in size within the two-dimensional plane as needed causes the canvas to appear to be generally infinite in size. In the example shown in FIG. 2, the canvas 134 has input thereon in the form of digital ink 140. The canvas 134 also comprises a reference grid 138, over which the digital ink 140 is applied. The web browser application window 130 also comprises a menu bar 136 providing a plurality of selectable icons, including a collaboration icon 142, with each icon providing a respective function or group of functions.

Figure 3:
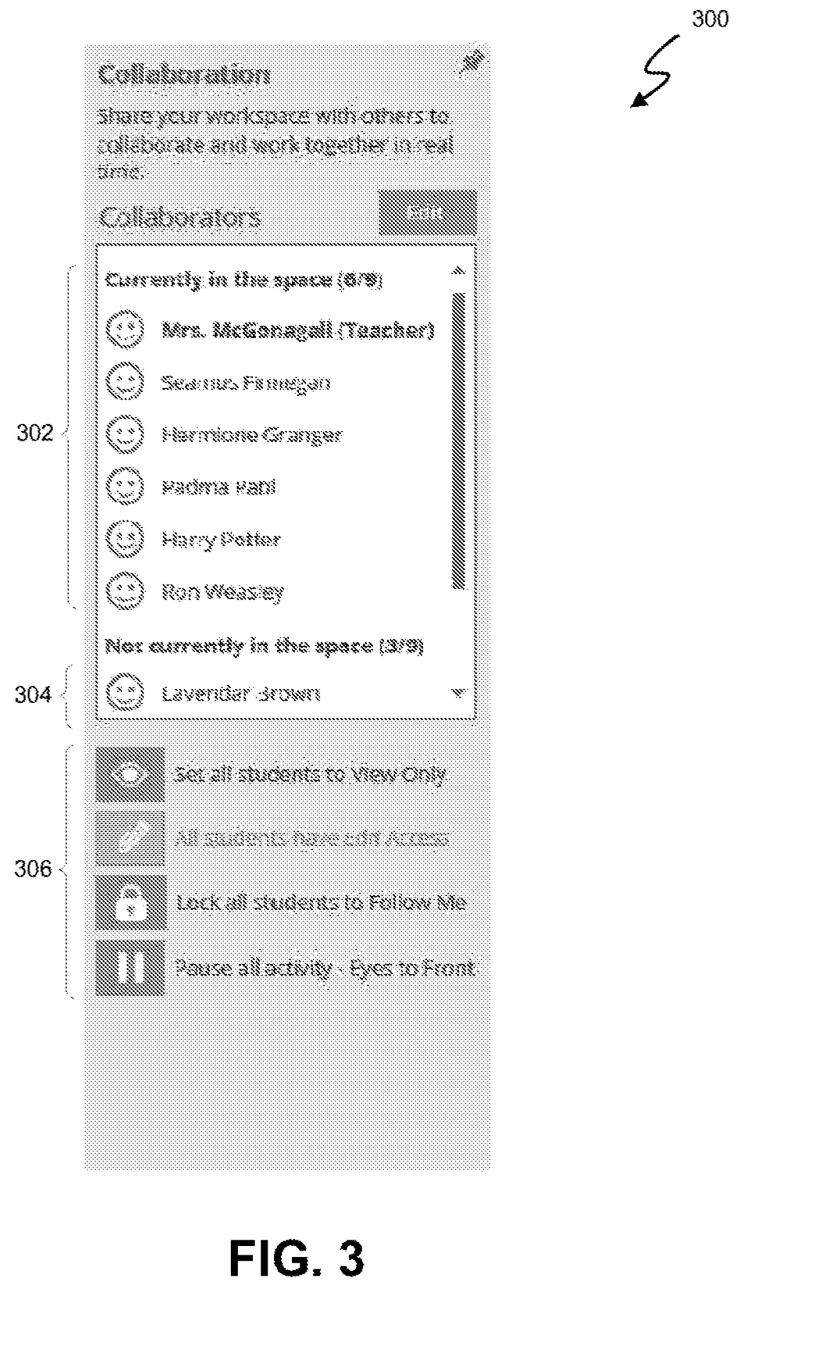
FIG. 3 is a schematic view of a collaboration menu for the exemplary web browser application window illustrated in FIG. 2.

Referring to FIG. 3, a sample collaboration menu is illustrated generally by numeral 300. The collaboration menu 300 is launched in response to selection of the collaboration icon 142. The collaboration menu 300 includes an active participant list 302, an inactive participant list 304 and a plurality of collaboration-specific selectable icons 306. The active participant list 302 identifies all of the participants who are active in the collaborative session. The inactive participant list 304 identifies all of the participants who are not active in the collaborative session.

Each of the participants in the collaboration application can change the view of the canvas 134 presented on their computing devices, independently of the other participants, through pointer interaction therewith. For example, the collaboration application, in response to one finger held down on the canvas 134, pans the canvas 134 continuously. The collaboration application is also able to recognize a "flicking" gesture, namely movement of a finger in a quick sliding motion over the canvas 134. The collaboration application, in response to the flicking gesture, causes the canvas 134 to be smoothly moved to a new view displayed within the web browser application window 130.

As will be appreciated, different participants can end up viewing and annotating different portions of the canvas 134. In order to facilitate collaboration and discussion, the participants are able to manipulate their view or the view of another one of the participants within the collaboration session. That is, one or more participants can lock their view to that of one of the other participant's view and "track" that participant as that other participant moves around the canvas. Similarly, one of the participants can request that the views of the other participants' views are locked to his or her view. In both cases the collaborative aspect of the collaboration session is maintained and the participants are still capable of annotating or otherwise contributing to the shared view. Such a feature facilitates easier discussion, collaboration, demonstration and presentation, especially within a large canvas. For ease of convenience only, this feature is referred to generally as view manipulation or tracking. As will be described, different types of view manipulation can be implemented. For example, the participants can choose to lock their view to another participant's view either for a brief moment, referred to as a "find", or for a longer period of time, referred to as a "follow". The participants can also choose to lock another participant's view to their own view either for a brief moment, referred to as "found", or for a longer period of time, referred to as "followed".

As an example, in a classroom situation, a teacher can choose to lock one or more students to his or her view to provide instruction or a give a presentation. As another example, one student could have all other students and the teacher follow his or her view while demonstrating or presenting a concept. As another example, students working in a small group can choose to lock their views together to be better able to discuss what they are creating.

Figure 4:
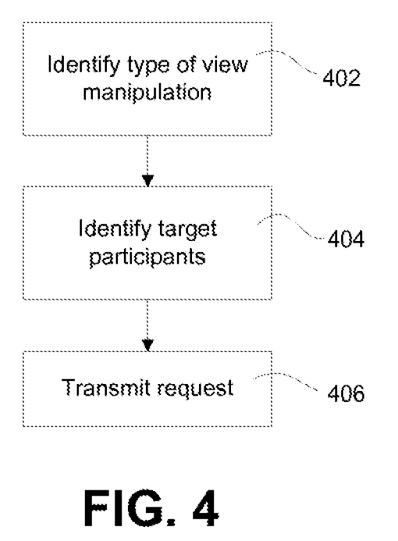
FIG. 4 is a flowchart illustrating generation of a view manipulation request.

Referring to FIG. 4, a flowchart illustrating generation of a view manipulation request is shown generally by numeral 400. At step 402, a requesting participant selects a type of view manipulation to implement. That is, the requesting participant selects whether the view manipulation type is a find or a follow. If the view manipulation is a find, the requesting participant selects whether he or she wishes to find another participant or to be found by another participant. If the view manipulation is a follow, the requesting participant selects whether he or she wishes to follow another participant or to be followed by another participant.

At step 404, the requesting participant identifies one or more target participants from the other participants. As will be appreciated, if the requesting participant wishes to find or to follow the target participant, only one target participant is identified. If the requesting participant wishes to be found or be followed by the target participant, more than one target participant may be identified.

At step 406, a request is sent to the remote host server. The request includes a requesting participant identifier, a request identifier and a target participant identifier. The requesting participant identifier identifies the requesting participant. The request identifier identifies the type of view manipulation to implement. The target participant identifier identifies all of the target participants.

As will be appreciated, the requesting participant identifier may be expressly included in the request. Optionally, the requesting participant identifier may be implicitly determined by the remote host server based on the connection from which the request was received.

Figure 5:
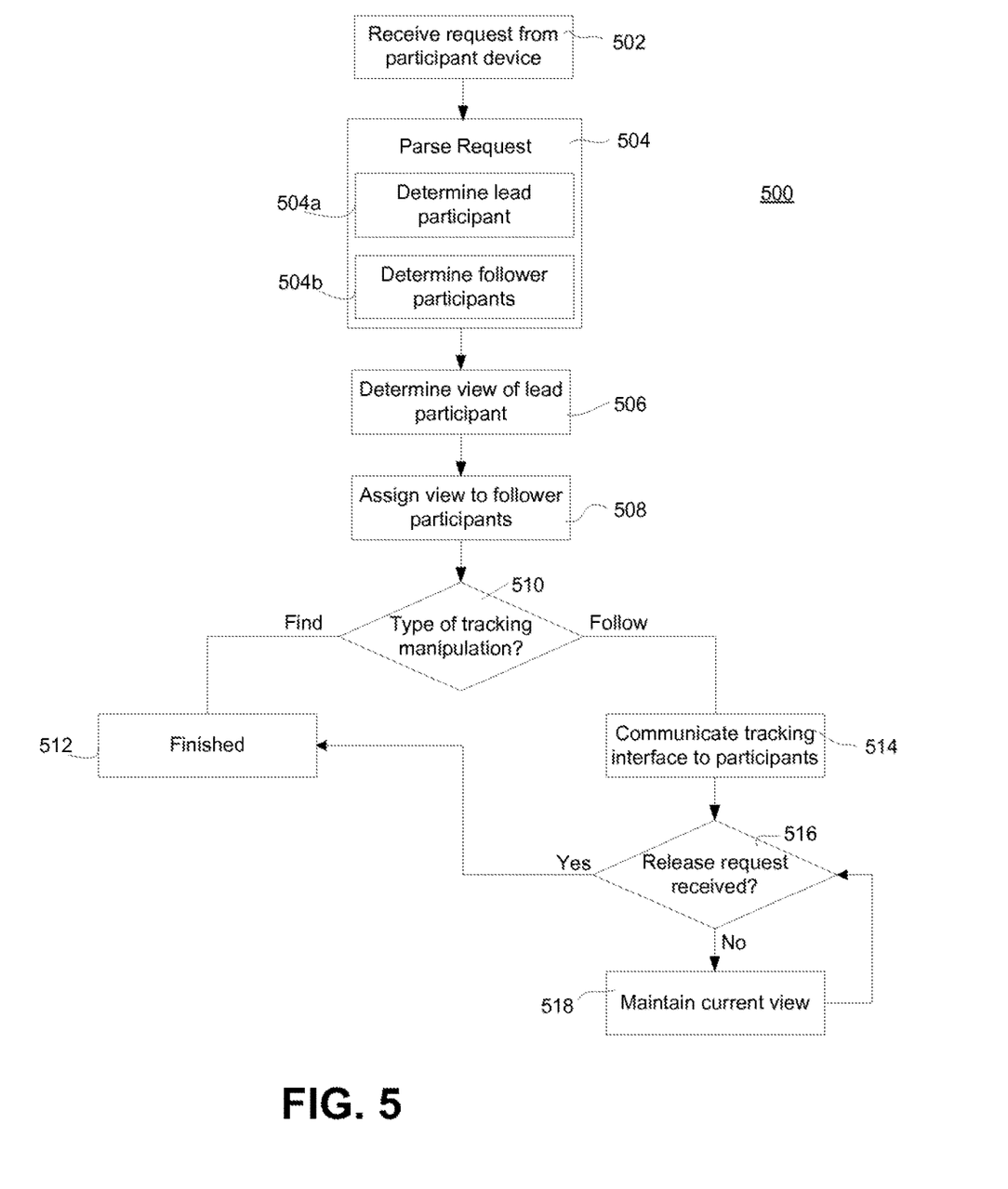
FIG. 5 is a flowchart illustrating operation of the view manipulation.

Referring to FIG. 5, a flowchart illustrating the steps implemented by the remote host server is shown generally by numeral 500. At step 502, the request is received from the requesting participants device. At step 504, the request is parsed. At step 504a it is determined, from the request, which of the participants is to be found or followed. For ease of explanation, this participant will be referred to as a lead participant. At step 504b, it is determined, from the request, which of the participants are to find or follow the lead participant. For ease of explanation, these participants will be referred to as follower participants.

At step 506, the view of the lead participant is determined. In an embodiment, the remote host server has access to the views of all of the participants. Accordingly, determining the view of the lead participant is a matter of retrieving the view for that participant. In an alternative embodiment, the remote host server determines the view of the lead participant by retrieving it from the lead participant's computing device. As will be described, the lead and follower participants may have multiple distinct areas of the canvas in their view.

At step 508, the view of each of the follower participants is replaced with the view of lead participant. At step 510 the remote host server determines whether the type of tracking manipulation in the request is a find type of tracking manipulation or a follow type of tracking manipulation. If the type of view manipulation is a find type of view manipulation, then the remote host continues at step 512 and the operation is complete. That is, as described above, a find type of view manipulation allows one or more follower participants to be locked to the lead participant momentarily. Accordingly, once the view displayed on the follower participants' computing device has changed to that of the lead participant's view, the follower participants are free to manipulate their view independently of the lead participant.

Figure 6:
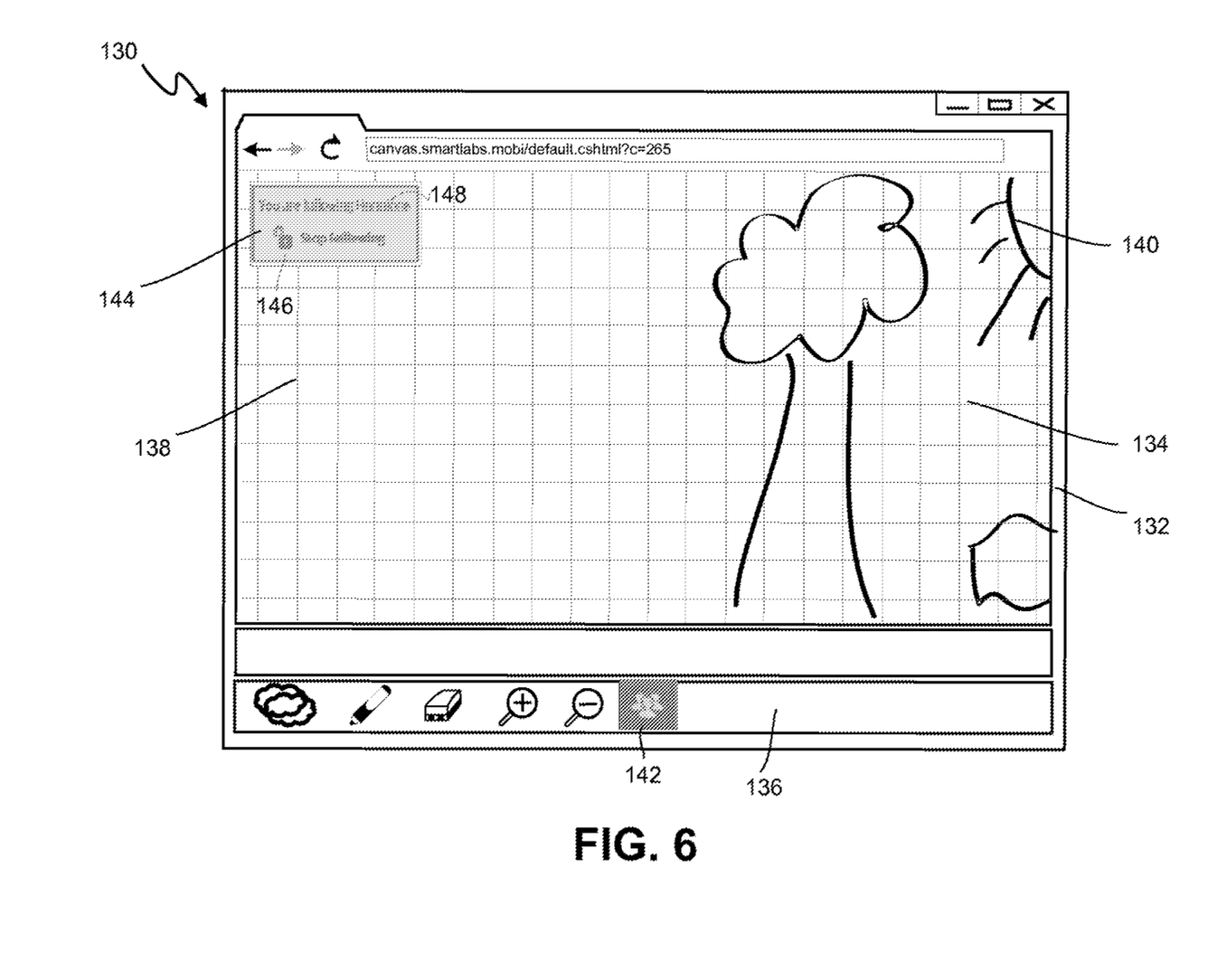
FIG. 6 is a schematic view of an exemplary web browser application window illustrating a tracking window.

Returning to step 510, if the type of view manipulation is a follow type of view manipulation, then the remote host server continues at step 514. At step 514, the remote host server communicates with the lead participant's computing device and follower participants' computing devices to display a tracking window within the web browser application window 130. Referring to FIG. 6, the exemplary tracking window 144 is illustrated in the web browser application window 130. The tracking window 144 includes a release request element 146. The release request element is a user selectable input element, such as hypertext, a button, or the like that allows the user of the computing device to cancel the tracking manipulation by communicating a release request from the participant's computing device to the remote host server. In the example illustrated in FIG. 6, the release request element 146 is an icon representing a lock. Optionally, the tracking window 144 also includes a tracking participant list 148. The tracking participant list 148 identifies, for each participant, which other participant is being followed or which other participants are following the participant. In the example illustrated in FIG. 6, the tracking participant list 148 indicates that the participant is following Hermione. If the participant wishes to stop following Hermione, the participant can select the release request element 146 and a release request is communicated from the participant computing device to the remote host server.

At step 516, the remote host server determines if it has received a release request from any of the lead participant or follower participants. If the release request has not been received, then at step 518 the remote host maintains the view of the lead participant as the view for the follower participants and inhibits the follower participants from manipulating the view. If the release request has been received, then the remote host server continues at step 512 and the operation is complete. Accordingly, once the follower participants are released, they are free to manipulate their view independently of the lead participant. As will be appreciated, the follower participants may be released individually. For example, each of the follower participants may request that they be released from following the lead participant. The follower participants may also be released all at once. For example, the lead participant may request that the he or she stop leading the follower participants.

As described above, the follower participants track the view of the lead participant. However, even though the follow participants may be locked to the lead participant, it is still a collaborative environment. Therefore both the lead participant and the follower participants may contribute equally to the collaborative session.

Although the embodiments described above reference a large "infinite" canvas space, other collaborative environments and document types may also benefit for manipulating the view. Examples of such document types include spreadsheets and paged documents such Notebook, PowerPoint, Word and the like. In any case where a document can be edited collaboratively, being able to find and follow the view of your collaborators would be of value.

In the embodiments described above, follower participant views are automatically manipulated to a lead participant view in response to a request from the lead participant to be followed or to be found. In an alternative embodiment, the remote host server communicates with each of the follower participants computing devices to present a permission request window in the web browser application window 130. The permission request window includes a permission request element. The follow request element is a user selectable input element, such as hypertext, a button, or the like that allows the follower participants to accept or decline the request from the lead participant to be followed or be found. In this embodiment, each of the target participant views tracks the lead participant's view only if the target participant has accepted the permission request.

In yet an alternative embodiment, whether or not the permission request window is presented to the target participants depends on the lead participant. In this embodiment, the lead participant can select from two options when requesting that the he or she be followed or found. A first option is a "follow me" or "find me" option. If the lead participant selects the first option then the permission request window is presented to the follower participants who may accept or decline the request to the follow the lead participant. A second option is a "follow me now" or "find me now" option. If the lead participant selects the second option then the follower participants have their views tracked to the view of the lead participant without the ability to decline the request to the follow the lead participant.

In yet an alternative embodiment, after step 516 the remote host server may request confirmation that the release request be granted prior to releasing the participant who submitted the release request from the view manipulation. For example, the participant who requested the view manipulation may be asked to confirm that the release request be granted. As another example, the participant being followed may be asked to confirm that the release request be granted.

In yet an alternative embodiment, the remote host server stores the view for one or more of the follower participants before changing their view to track the lead participant. Thus, once the follower participants have finished tracking the lead participant they can readily be returned to their previous view. In this embodiment, once the follower participants have finished tracking the lead participant, the remote host server communicates with each of the follower participants computing devices to present a return request window in the web browser application window 130. The return request window includes a return request element. The return request element is a user selectable input element, such as hypertext, a button, or the like that allows the follower participants to return to their view immediately prior to tracking the view of the lead participant.

In the embodiments described above, while the follower participants are following the lead participant, the remote host maintains the view of the lead participant and inhibits the follower participants from manipulating the view, even though the follower participant can contribute within the view. In an alternative embodiment, some or all of the lead participant and the follower participants may have permission to manipulate the view. However, such manipulation is presented to all of the lead participant and the follower participants.

As will be appreciated by a person skilled in the art, the various GUIs presented herein are exemplary only. The GUI can be configured a number of different ways to provide the participants with the ability to track other participants as described above. Further, in the embodiments described above, the view manipulation is implemented by the remote host server and then communicated to each of the computing devices. However, in other embodiments, tracking the views between various participants may be implemented by the computing devices, wherein communication between the computing devices is facilitated by the remote host server. Yet further, although the embodiments above reference a remote host server, one skilled in the art will appreciate that the host server could be a local host server facilitating collaboration within a single organization.

In yet an alternative embodiment, the remote host server downloads a software application (also known as a plugin) that runs within the web browser on the client side i.e., the user's computing device. This application can perform many operations without the need for communication with the remote host server.

In yet an alternative embodiment the collaboration application is implemented as a standalone application running on the user's computing device. The user gives a command (such as by clicking an icon) to start the collaboration application. The application collaboration starts and connects to the remote host server by following the pre-defined address of the server. The application displays the canvas to the user along with the functionality accessible through buttons or menu items.

Figure 7:
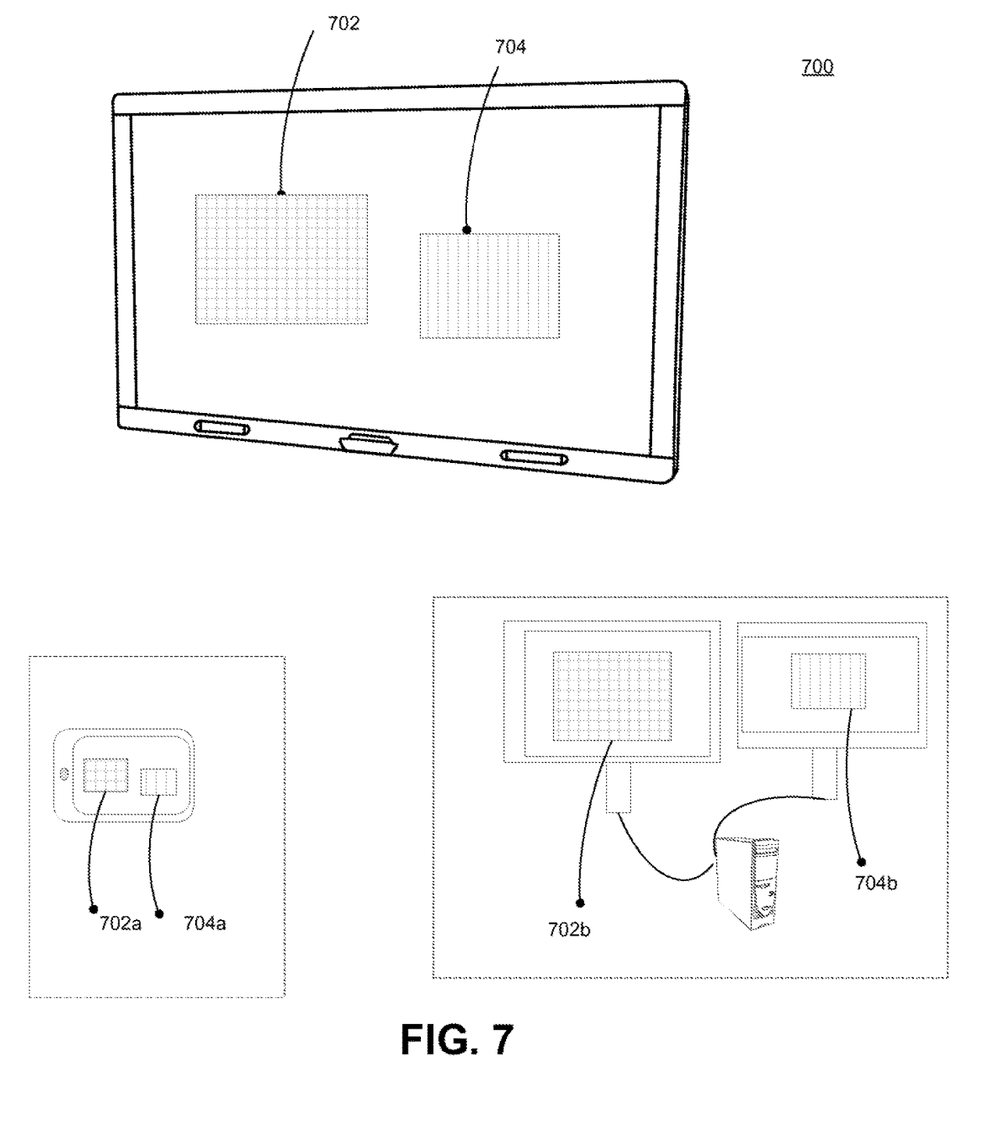
FIG. 7 is a schematic view of an exemplary setup where the lead participant view has multiple areas or windows of the same canvas.

Referring to FIG. 7, yet an alternative embodiment is illustrated generally by numeral 700. In this embodiment, the lead participant view includes N areas or windows 702 and 704 of the canvas. For ease of explanation only, in this example N is two. The follower participants are able to follow all N areas of the canvas that appear in the view of the lead participant. For each participant, the views may be displayed as multiple areas on a single display, as full screen displays on N different display devices, or a combination thereof. As shown in FIG. 7, a first follower participant may view windows 702*a*, 704*a* on a single display, while a second follower participant views the two areas as windows 702*b* and 704*b* on separate physical displays.

Figure 8:
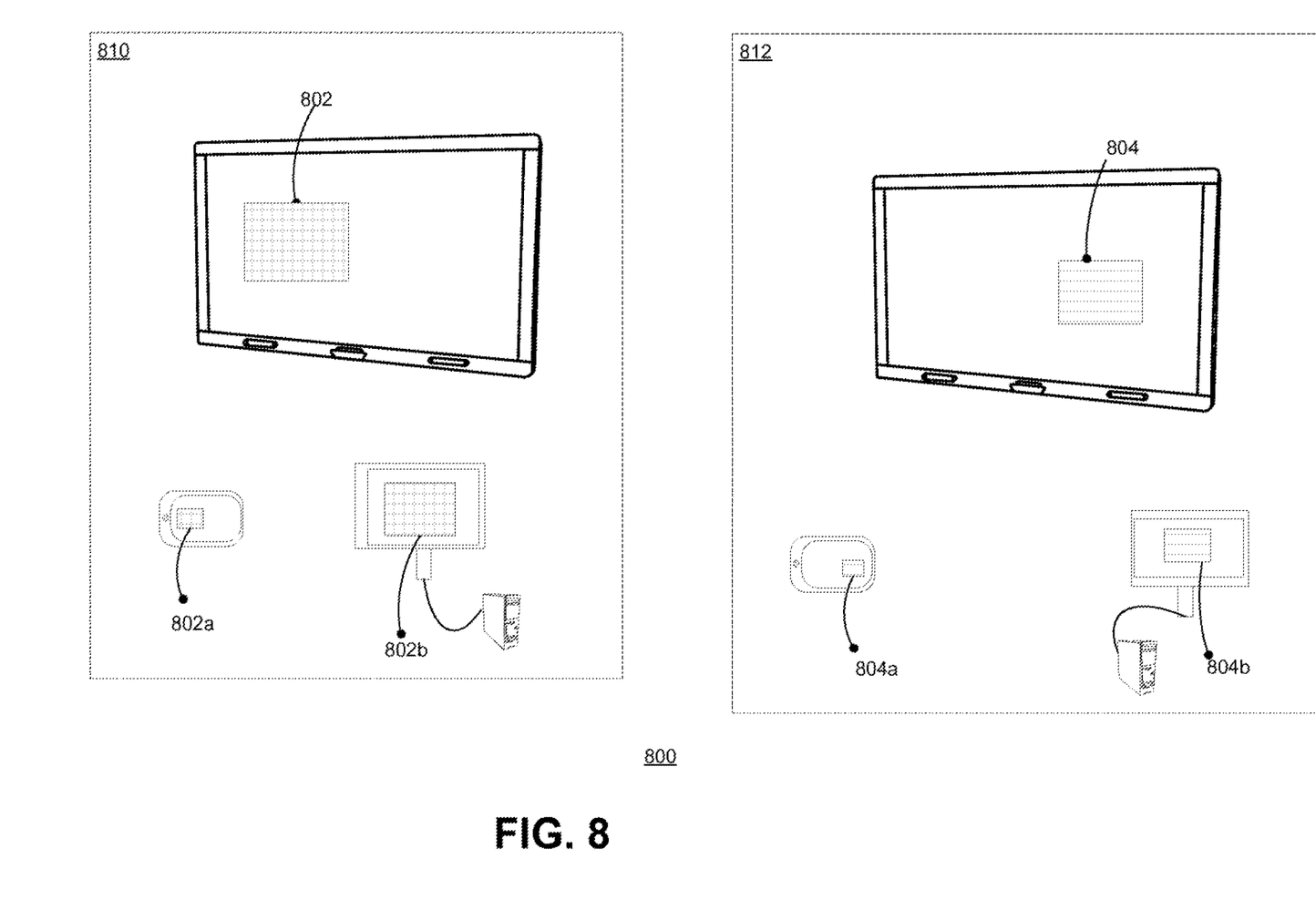
FIG. 8 is a schematic view of an exemplary setup where two lead participants having different views of the same canvass are followed by different follower participants.

Referring to FIG. 8, yet an alternative embodiment is illustrated generally by numeral 800. In this embodiment, there may be a plurality of lead participants and a plurality of follower participants that follow one of the plurality of lead participants. The participants may be organized into working groups. For example, as shown in FIG. 8, the participants are grouped into a first working 810 and a second working group 812. The follower participants in the first working group 810 may follow the view 802 of the first lead participant, which is shown as views 802*a* and 802*b* on the follower participants' devices. The follower participants in the second working group 812 may follow the view 804 of the second lead participant, which is shown as views 804*a* and 804*b* on the second groups follower participants' devices. In this embodiment the views 802 and 804 are different portions or areas of the same canvas. Thus multiple groups of participants may use the same canvas and each group may have its own lead participant and one or more follower participants.

In a variation of the above embodiment, one follower participant may choose to follow two or more different lead participants. Similarly, a group of follower participants may choose to follow two or more lead participants. Conversely, two or more lead participants may compel a group of follower participants to follow them by locking the follower participant views to their views, leading to multiple windows of the canvas being displayed on each follower participants' views. As will be appreciated by a person skilled in the art, numerous variations and permutations of the above groupings, and follow or find operations are possible.

Although in embodiments described above the interactive input system is described as utilizing an LCD device for displaying the images, those skilled in the art will appreciate that other types of interactive input systems may be used. For example, an interactive input system that includes a boom assembly to support a short-throw projector such as that sold by SMART Technologies ULC under the name "SMART UX60", which projects an image, such as for example, a computer desktop, onto the interactive surface 24 may be employed.

Although embodiments have been described above with reference to the accompanying drawings, those of skill in the art will appreciate that variations and modifications may be made without departing from the scope thereof as defined by the appended claims.

What is claimed is:

1. A non-transitory computer-readable storage medium storing instructions that, when executed by a computing system, cause the computing system to perform operations for providing a collaboration session between a lead participant's device and one or more follower participant devices, said collaboration session including a canvas shared by lead participant's device and the one or more follower participant devices, wherein the instructions comprise:
   identifying the lead participant;
   determining a lead view of the lead participant;
   identifying at least one of the follower participant devices;
   receiving a request to manipulate a view displayed by the at least one of the follower participant devices;
   in response to the request, communicating the lead view of the lead participant to the at least one of the follower participant devices for display; and receiving a release request and communicating the lead view to the follower participant devices at least until the release request is received;

wherein the lead and follower participants have multiple distinct areas of the canvas in their views.

2. The non-transitory computer-readable storage medium of claim 1 wherein the instructions further comprise inhibiting the follower participants from manipulating the lead view in response to the request.

3. The non-transitory computer-readable storage medium of claim 2 wherein the instructions further comprise processing input received from one or more of the follower participant devices within the lead view while the follower participants are inhibited from manipulating the lead view.

4. The non-transitory computer-readable storage medium of claim 1 wherein the release request identifies which of one or more of the follower participant devices to cease communicating the lead view.

5. The non-transitory computer-readable storage medium of claim 1 wherein receiving the release request includes receiving the release request from one or more of the follower participant devices.

6. The non-transitory computer-readable storage medium of claim 1 wherein receiving the release request includes receiving the release request from the lead participant's device.

7. The non-transitory computer-readable storage medium of claim 1 wherein the instructions further comprise storing the view displayed by the follower participant devices before communicating the lead view.

8. The non-transitory computer-readable storage medium of claim 7 wherein the instructions further comprise:

receiving a release request; and communicating the stored view to the follower participants in response to the release request.

9. A computing system having a plurality of participant devices and a computing device that is configured to perform operations for providing a collaboration session between the computing device and the participant devices, said collaboration session including a canvas shared by lead participant's device and the one or more follower participant devices, wherein the operations comprise:

identifying a lead participant from the plurality of participant devices;

identifying one or more follower participant devices from the plurality of participant devices;

determining a lead view of the lead participant;

receiving a request to manipulate a view displayed on a canvas by at least one of the follower participant devices;

in response to the request, communicating the lead view of the lead participant to the at least one of the follower participant devices for display; and storing a view displayed by one of the follower participant devices and communicating the lead view after the storing;

wherein the lead and follower participants have multiple distinct areas of the canvas in their views.

10. The computing system of claim 9 wherein the computing device is configured to manipulate the view displayed on the follower participant devices upon acceptance of the request.

11. The computing system of claim 9 wherein the operations further comprise communicating a permission request to the follower participants computing devices and only communicating the lead view when the permission request is accepted.

12. The computing system of claim 9 wherein the operations further comprise receiving a request to restore the stored view and communicating the stored view to the one of the follower participants in response to the request to restore.

13. A method, comprising:

identifying one computing device of a plurality of computing devices as a lead participant with a lead view;

identifying at least one of the computing devices as a follower participant device;

providing a canvas shared by the lead participant device and the follower participant device;

receiving a request from the lead participant to manipulate a view displayed on the follower participant device;

in response to the request to manipulate the view, replacing a current view of the follower participant device with the lead view; and storing the current view before replacing the current view with the lead view;

wherein the lead and follower participants have multiple distinct areas of the canvas in their views.

14. The method of claim 13, wherein the lead participant and the follower participant device are identified from the request to manipulate the view.

15. The method of claim 13 further comprising repeatedly communicating the lead view to the follower participant device at least until a release request is received.

16. The method of claim 13, further comprising:

providing a permission request to the follower participant device to replace the current view with the lead view; and communicating the lead view when the permission request is accepted.

17. The method of claim 13, further comprising receiving a request to restore the current view and communicating the stored view to the participant device in response to the request to restore.

* * * * *